(12) United States Patent
Heinle et al.

(10) Patent No.: US 11,910,979 B2
(45) Date of Patent: Feb. 27, 2024

(54) WATER-USING DOMESTIC APPLIANCE AND METHOD FOR OPERATING A WATER-USING DOMESTIC APPLIANCE

(71) Applicant: BSH Hausgeräte GmbH, Munich (DE)

(72) Inventors: Martin Heinle, Glött (DE); Anton Oblinger, Wertingen (DE)

(73) Assignee: BSH Hausgeräte GmbH, Munich (DE)

( * ) Notice: Subject to any disclaimer, the term of this patent is extended or adjusted under 35 U.S.C. 154(b) by 670 days.

(21) Appl. No.: 16/641,665

(22) PCT Filed: Sep. 26, 2018

(86) PCT No.: PCT/EP2018/076070
§ 371 (c)(1),
(2) Date: Feb. 25, 2020

(87) PCT Pub. No.: WO2019/068528
PCT Pub. Date: Apr. 11, 2019

(65) Prior Publication Data
US 2020/0214529 A1 Jul. 9, 2020

(30) Foreign Application Priority Data
Oct. 6, 2017 (DE) .................... 10 2017 217 801.9

(51) Int. Cl.
*C02F 1/00* (2023.01)
*B01D 29/64* (2006.01)
(Continued)

(52) U.S. Cl.
CPC ....... *A47L 15/0039* (2013.01); *A47L 15/4208* (2013.01); *A47L 15/4221* (2013.01);
(Continued)

(58) Field of Classification Search
CPC ............ A47L 15/0039; A47L 15/4208; A47L 15/4221; A47L 15/00; A47L 15/42;
(Continued)

(56) References Cited

U.S. PATENT DOCUMENTS 7,431,774 B2 10/2008 Kim
2002/0028501 A1 3/2002 McMinn
(Continued)

FOREIGN PATENT DOCUMENTS

CN 1464104 A 12/2003
CN 102485309 A 6/2012
(Continued)

OTHER PUBLICATIONS

DE 3745169 C2 English description, Jul. 1999, Fumagalli Niso.*
(Continued)

*Primary Examiner* — Akash K Varma
(74) *Attorney, Agent, or Firm* — Michael E. Tschupp; Andre Pallapies; Brandon G. Braun (57) ABSTRACT

A water-using household appliance includes a pump sump, a filter element arranged at least partially in the pump sump, and a nozzle unit arranged on the pump sump. The nozzle unit produces an annular flow between the pump sump and the filter element in order to remove dirt from the filter element, with the annular flow flowing around the filter element only in one direction of flow.

19 Claims, 4 Drawing Sheets

(51) Int. Cl.
  *B01D 29/11* (2006.01)
  *A47L 15/00* (2006.01)
  *A47L 15/42* (2006.01)
  *C02F 103/00* (2006.01)

(52) U.S. Cl.
  CPC ........ *B01D 29/114* (2013.01); *B01D 29/6438* (2013.01); *C02F 1/001* (2013.01); *C02F 2103/002* (2013.01); *C02F 2303/16* (2013.01); *C02F 2307/12* (2013.01)

(58) Field of Classification Search
  CPC .............. A47L 15/4206; B01D 29/114; B01D 29/6438; B01D 29/64; B01D 29/11; B01D 29/31; C02F 1/001; C02F 1/00; C02F 2103/002; C02F 2303/16; C02F 2307/12
  USPC ........................................................... 134/18
  See application file for complete search history.

(56) References Cited

U.S. PATENT DOCUMENTS

| | | |
|---|---|---|
| 2008/0149136 A1 | 6/2008 | Yoon |
| 2011/0120508 A1 | 5/2011 | Yoon et al. |
| 2013/0037065 A1 | 2/2013 | Kokbiyik et al. |
| 2014/0091029 A1 | 4/2014 | Van Savooijen |
| 2016/0184746 A1 | 6/2016 | Bautz |
| 2016/0263508 A1 | 9/2016 | Pflueger |
| 2016/0334175 A1 | 11/2016 | Eckert |
| 2018/0236407 A1 | 8/2018 | Shevitz |

FOREIGN PATENT DOCUMENTS

| | | | |
|---|---|---|---|
| CN | 106180062 A | 12/2016 | |
| DE | 3745169 C2 * | 7/1999 | ............. A47L 15/42 |
| GB | 2096456 A * | 2/1982 | ............. A47L 15/42 |
| GB | 2096456 A | 10/1982 | |
| KR | 20020047874 A | 6/2002 | |
| WO | 2009077279 A1 | 6/2009 | |
| WO | 2009077280 A1 | 6/2009 | |

OTHER PUBLICATIONS

National Search Report DE 10 2017 217 801.9 dated Aug. 27, 2018.
International Search Report PCT/EP2018/076070 dated Nov. 27, 2018.
National Search Report CN 22018800650862 dated Aug. 29, 2022.

* cited by examiner

WATER-USING DOMESTIC APPLIANCE AND METHOD FOR OPERATING A WATER-USING DOMESTIC APPLIANCE

CROSS-REFERENCES TO RELATED APPLICATIONS

This application is the U.S. National Stage of International Application No. PCT/EP2018/076070, filed Sep. 26, 2018, which designated the United States and has been published as International Publication No. WO 2019/068528 A1 and which claims the priority of German Patent Application, Serial No. 10 2017 217 801.9, filed Oct. 6, 2017, pursuant to 35 U.S.C. 119(a)-(d).

BACKGROUND OF THE INVENTION

The present invention relates to a water-using household appliance and a method for operating a water-using household appliance.

A dishwasher has a dishwasher cavity, on the base of which a pump sump can be provided. A filter sieve for filtering washing liquor is normally arranged in the pump sump. This can be removed and manually cleaned in order to clean the filter sieve.

U.S. Pat. No. 7,431,774 B2 further shows a dishwasher with a pump sump and a filter arranged in the pump sump. Cleaning nozzles are provided in the pump sump and have a plurality of fluid outlet openings for spraying the filter.

BRIEF SUMMARY OF THE INVENTION

Against this background an object of the present invention consists in providing an improved water-using household appliance.

Accordingly a water-using household appliance, in particular a household dishwasher, is provided with a pump sump, a filter element arranged at least partially in the pump sump, and a nozzle unit which is arranged on the pump sump, wherein the nozzle unit is designed to produce an annular flow between the pump sump and the filter element in order to remove dirt from the filter element, said flow flowing around the filter element only in one direction of flow.

It has surprisingly been found that with the help of the annular flow a homogeneous cleaning effect can be achieved on the filter element, in particular over 360°. The filter element is preferably accommodated by a filter receptacle of the filter element. A "direction of flow" here means a clockwise flow or an anti-clockwise flow. The direction of flow preferably runs along a substantially circular or oval path. The nozzle unit is preferably arranged at least partially between the pump sump and the filter element. "Annular flow" means a fluid mass flow, in particular a washing liquor mass flow. "Washing liquor" here means a fluid such as water for example, which for example can contain cleaning additives and sometimes dirt. The nozzle unit is preferably a separate component from the pump sump, which for example comprises plastic or metal or is formed from plastic or metal. The nozzle unit can alternatively be integrally molded from a single piece of material on the pump sump. The nozzle unit preferably comprises a channel for channeling a fluid or washing liquor.

According to one embodiment the filter element comprises a microfilter which is embodied as tubular, a microfilter inner side enclosing an inner compartment of the microfilter and a microfilter outer side, wherein the nozzle unit is designed to produce the annular flow around the microfilter outer side, such that the dirt is removed from the microfilter inner side toward the inner compartment.

The advantage of this is that the microfilter inner side, which can have an increased tendency to soil, can be cleaned and the corresponding dirt sucked directly out of the inner compartment. Furthermore, the filter element can comprise a coarse filter which is arranged above the microfilter and is for example connected thereto. Furthermore, the filter element can comprise a fine filter, which is for example arranged above the microfilter and sometimes around the coarse filter. The fine filter can for example be embodied as a flat and fine sieve structure. The coarse filter can for example be pot-shaped and can be embodied as a coarse sieve structure. The microfilter can also be embodied as a sieve structure. Furthermore, another tubular sieve structure different from the sieve structure can be embodied radially outside and/or radially inside the sieve structure of the microfilter. The microfilter can thus for example be formed from different sieve structures. The microfilter inner side and/or the microfilter outer side can for example substantially have the shape of a cylindrical jacket. The microfilter inner side and/or the microfilter outer side can for example have the shape of an endless bellows. "Tubular" here means that the microfilter is embodied as annular, in particular circular, in cross-section. The nozzle unit preferably merely comprises fluid outlet openings or one fluid outlet opening, each of which is designed to form or ensure a fluid outlet running substantially tangentially to a tubular shape of the microfilter.

According to a further embodiment the water-using household appliance comprises a drain pump which is designed to suck washing liquor together with dirt directly out of the inner compartment.

The advantage of this is that the dirt can be sucked directly out of the inner compartment, in which the dirt exhibits the greatest blockage effect. The pump sump for example comprises an opening which faces the inner compartment of the microfilter and by means of which the drain pump sucks washing liquor out of the inner compartment of the microfilter. The drain pump is for example designed to suck or convey washing liquor together with dirt to a drain outside the household appliance.

According to a further embodiment the pump sump has a side wall which surrounds the filter element, so that an annular gap is formed between the filter element and the side wall.

For example, the side wall is a wall of the filter receptacle of the pump sump. A base wall can for example be integrally molded onto the side wall, and together these form the filter receptacle. The side wall and the filter element are arranged such that the annular flow is formed or created. In this case the annular flow runs along the wall. The side wall surrounds the filter element for example radially and extends in a depth direction which for example points perpendicularly downward. For example, the side wall has a radial opening, through which washing liquor filtered by the filter element and flowing from the inner compartment of the microfilter to the annular gap can be conveyed. The annular gap can be seen as an annular space between the microfilter and the filter receptacle.

According to a further embodiment the nozzle unit comprises a first nozzle section which projects from above into the annular gap.

The advantage of this is that an initial region of the annular flow can be oriented precisely and in particular tangentially to the tubular shape of the microfilter. The first nozzle section preferably comprises one or more fluid outlet openings, each of which is designed to form or ensure the fluid outlet running substantially tangentially to the tubular shape of the microfilter.

According to a further embodiment the nozzle unit comprises a second nozzle section, on which the first nozzle section is integrally molded and which extends away from the annular gap.

The second nozzle section extends for example radially or tangentially away from the annular shape of the microfilter. The advantage of this is that flow losses can be reduced, since a channel of the second nozzle section has fewer curves or none at all.

According to a further embodiment the first nozzle section is curved around the filter element.

The advantage of this is that the first nozzle section fits perfectly into the annular gap, since the first nozzle section for example follows the course of the annular gap in one section of the annular gap. The first nozzle section for example has the shape of a segment of a circle.

According to a further embodiment the water-using household appliance comprises a water switch which is designed to interrupt a supply of fluid to the nozzle unit, so that the annular flow is interrupted.

The advantage of this is that the nozzle unit or the annular flow can be selectively actuated and hence does not have to run permanently during a wash cycle of the household appliance.

According to a further embodiment the water-using household appliance comprises one spray arm and/or two spray arms and/or a ceiling spray device, wherein the water switch is designed to interrupt and/or control a supply of fluid to the spray arm and/or the two spray arms and/or the ceiling spray device.

For example, the pump sump comprises a circulation pump which is designed to circulate washing liquor and to supply the first spray arm and/or the second spray arm and/or the ceiling spray device with washing liquor. Corresponding channels are of course embodied.

Furthermore, a method for operating a water-using household appliance, in particular as described above, is provided, wherein with the help of a nozzle unit an annular flow is produced between a pump sump and the filter element in order to remove dirt from the filter element, said flow flowing around a filter element only in one direction of flow.

According to a further embodiment, the annular flow is produced for between 20 and 240 seconds, preferably for between 40 and 220 seconds and further preferably for between 60 and 180 seconds.

According to a further embodiment a first wash cycle is performed, in which washing liquor is circulated within the water-using household appliance, wherein after the first wash cycle a first suction removal of washing liquor together with dirt is performed with the help of a drain pump, and wherein the annular flow is produced during, in particular at the end of, the first wash cycle.

For example, the annular flow is interrupted before the first suction removal of washing liquor. "Suction removal" can in this instance also be referred to as pumping out.

According to a further embodiment a second wash cycle, in which washing liquor is circulated within the water-using household appliance, is performed after the first suction removal, wherein after the second wash cycle a second suction removal of washing liquor together with dirt is performed with the help of the drain pump, and wherein the annular flow is produced during, in particular at the end of, the second wash cycle.

For example, the annular flow is interrupted before the second suction removal of washing liquor.

According to a further embodiment the annular flow is produced during a suction removal of washing liquor together with dirt with the help of a drain pump.

According to a further embodiment the annular flow is actuated by switching a water switch.

The embodiments, features and advantages described for the proposed device apply correspondingly to the proposed method and vice versa.

Further possible implementations of the invention also comprise combinations—not explicitly cited—of features or embodiments described above or below in respect of the exemplary embodiments. In this context, the person skilled in the art will also add individual aspects as improvements or enhancements to the respective basic form of the invention.

BRIEF DESCRIPTION OF THE DRAWINGS

Further advantageous embodiments and aspects of the invention form the subject matter of the subclaims and of the exemplary embodiments of the invention that are described below. The invention is described below in greater detail on the basis of preferred forms of embodiment with reference to the attached figures.

DETAILED DESCRIPTION OF EXEMPLARY EMBODIMENTS OF THE PRESENT INVENTION

In the figures, elements that are identical or have the same function are provided with the same reference characters unless otherwise stated.

Figure 1:
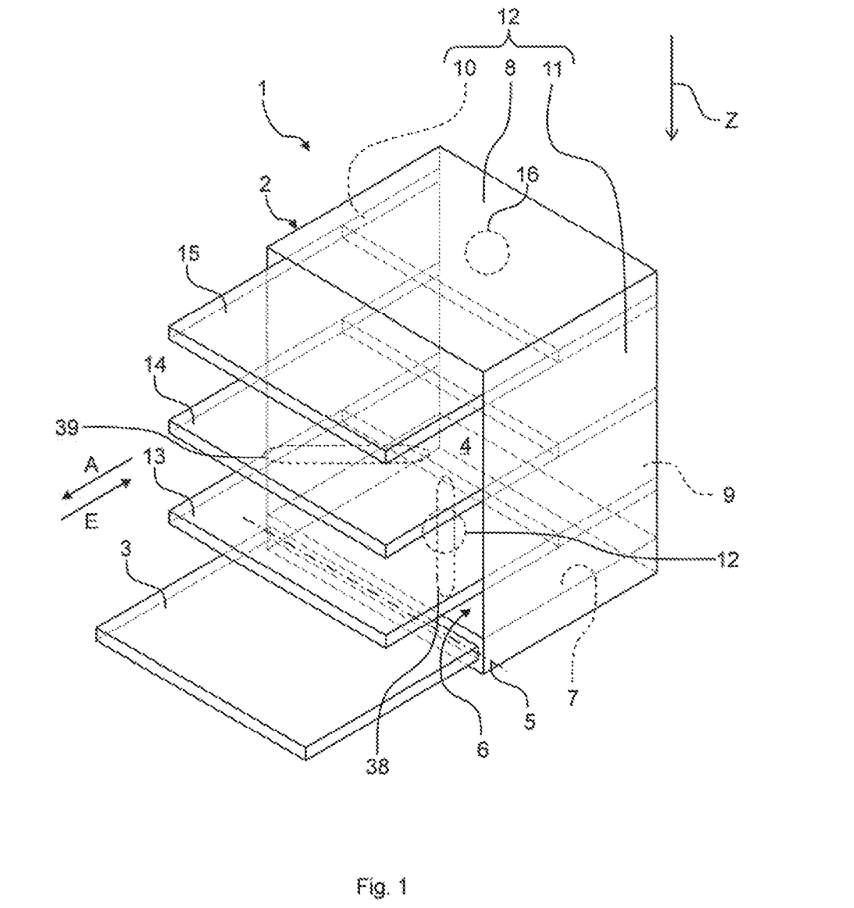
FIG. 1 shows a schematic perspective view of an embodiment of a water-using household appliance.

FIG. 1 shows a schematic perspective view of a water-using household appliance 1, in particular a household dishwasher. The household appliance 1 comprises a dishwasher cavity 2, which can be closed by a door 3, in particular in a watertight manner. To this end, a sealing facility can be provided between the door 3 and the dishwasher cavity 2. The dishwasher cavity 2 is preferably cuboid in shape. The dishwasher cavity 2 can be arranged in a housing of the household appliance 1. The dishwasher cavity 2 and the door 3 can form a dishwasher interior 4 for washing items to be washed.

The door 3 is shown in its opened position in FIG. 1. The door 3 can be closed or opened by pivoting about a pivot axis 5 provided on a lower end of the door 3. A loading opening 6 of the dishwasher cavity 2 can be closed or opened with the aid of the door 3. The dishwasher cavity 2 has a base plate 7, a ceiling 8 arranged opposite the base plate 7, a rear wall 9 arranged opposite the closed door 3 and two side walls 10, 11 arranged opposite one another. The base plate 7, the ceiling 8, the rear wall 9 and the side walls 10, 11 can be manufactured from a sheet steel, for instance. In particular, the base plate 7 can be manufactured from a different material to that of the ceiling 8 and the side walls 10, 11, for instance. For instance, the base plate 7 can be manufactured from the material 1.4301, the ceiling 8 and the side walls 10, 11 from the material 1.4016 and the rear wall 9 likewise from the material 1.4016. It is furthermore possible for the base plate 7 to be made from a plastic material.

The household appliance 1 further has a base arrangement 12 provided on the base plate 7. The household appliance 1 furthermore has at least one receptacle for items to be washed 13 to 15. A number of, for instance three, receptacles for items to be washed 13 to 15 can preferably be provided, wherein the receptacle for items to be washed 13 can be a lower receptacle for items to be washed or a bottom basket, the receptacle for items to be washed 14 can be an upper receptacle for items to be washed or an upper basket and the receptacle for items to be washed 15 can be a cutlery drawer. As also shown in FIG. 1, the receptacles for items to be washed 13 to 15 are arranged one above the other in the dishwasher cavity 2. Each receptacle for items to be washed 13 to 15 can optionally be moved in or out of the dishwasher cavity 2. Each receptacle for items to be washed 13 to 15 can be inserted into the dishwasher cavity 2 in an insertion direction E and extracted from the dishwasher cavity 2 in an extraction direction A opposite to the insertion direction E.

Furthermore, a ceiling spray device 16 is provided on the ceiling 6, and is designed to spray washing liquor in the dishwasher interior 4. A spray arm 38 (in this case also referred to as the first spray arm) is further provided between the base plate 7 and the receptacle for items to be washed 13. The spray arm 38 is rotatably connected to the base plate 7 and/or the base arrangement 12 and is designed to spray washing liquor in the dishwasher interior 4. In addition, a spray arm 39 (in this case also referred to as the second spray arm) is provided, and is rotatably connected to an underside of the receptacle for items to be washed 14 and is designed to spray washing liquor in the dishwasher interior 4.

Figure 2:
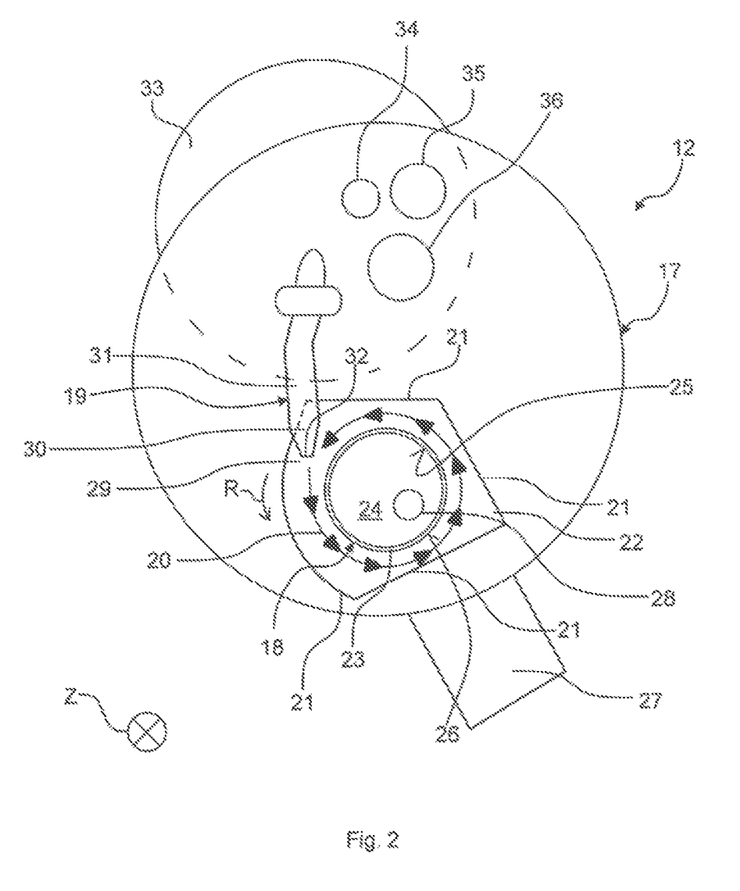
FIG. 2 shows, seen in a schematic top view, a first embodiment of a base arrangement of the water-using household appliance according to FIG. 1.

FIG. 2 shows a first embodiment of the base arrangement 12 of the household appliance 1 seen from a schematic top view. The base arrangement 12 comprises a pump sump 17, a filter element 18 at least partially arranged in the pump sump 17, and a nozzle unit 19 which is arranged at least partially between the pump sump 17 and the filter element 18, wherein the nozzle unit 19 is designed to produce an annular flow 20 between a side wall 21 of the pump sump 17 and the filter element 18 in order to remove dirt from the filter element 18, said flow flowing only in one direction of flow R around the filter element 18.

The pump sump 17 can be embodied as integral, in particular made from a single piece of material, with the dishwasher cavity 2, in particular with the base plate 7. In this case the side wall 21 extends in a depth direction z, which points from the ceiling 8 (see FIG. 1) perpendicularly downward to the base plate 7 (see FIG. 1). The direction of flow R furthermore runs perpendicular to the depth direction z and for example anti-clockwise in the top view. Alternatively the direction of flow R can run clockwise seen in the top view. Integrally molded onto the side wall 21 is a base wall 22 which preferably runs substantially perpendicular to the side wall 21 and on which the filter element 18 stands. The side wall 21 and the base wall 22 form a filter receptacle for the pump sump 17.

The filter element 18 comprises a microfilter 23 which is embodied as tubular, a microfilter inner side 25 enclosing an inner compartment 24 of the microfilter 23, and has a microfilter outer side 26, wherein the nozzle unit 19 is designed to produce the annular flow 20 around the microfilter outer side 26, so that the dirt is removed from the microfilter inner side 25 to the inner compartment 24. The base arrangement 12 further comprises a drain pump 27, which is designed to suck washing liquor together with dirt directly out of the inner compartment 24. An opening 28 of the pump sump 17 arranged underneath the inner compartment 24 is provided for this, and faces the inner compartment 24 and is fluidically connected to the drain pump 27 with the help of a fluid channel (not shown) arranged underneath the opening 28.

The side wall 21 surrounds the filter element 18 such that an annular gap 29 is formed between the filter element 18 and the side wall 21. The side wall 21 in this case has, seen from the top view, an angular shape, wherein the side wall 21 has rounded and flattened wall sections. Alternatively, the side wall 21 could, seen in the top view, have no corners and for example have a circular or oval contour.

The nozzle unit 19 comprises a first nozzle section 30 which projects from above into the annular gap 29 and has a fluid outlet opening 32, from which a jet of fluid leaves the nozzle unit 19 to form the annular flow 20. The nozzle unit 19 additionally has a second nozzle section 31, on which the first nozzle section 30 is integrally molded, wherein the second nozzle section 31 extends away from the annular gap 29. Preferably only fluid outlet openings 32 are provided on the nozzle unit 19, each of which is designed to form or to ensure a fluid outlet running substantially tangentially to the annular shape of the microfilter 23. In other words, for example, no fluid outlet opening is provided on the nozzle unit 19, which forms a fluid outlet direct to the inner compartment 24.

The base arrangement 12 further comprises a water switch 33, which is designed to interrupt a supply of fluid to the nozzle unit 19, so that the annular flow 20 is interrupted. The water switch 33 is further designed to interrupt and/or control a supply of fluid to the spray arm 38 (see FIG. 1) and/or the spray arm 39 (see FIG. 1) and/or the ceiling spray device 16 (see FIG. 1). The pump sump 17 further comprises a first opening 34, with the help of which the ceiling spray device 16 is supplied with washing liquor, and/or a second opening 35, with the help of which the spray arm 39 is supplied with washing liquor, and/or a third opening 36, with the help of which the spray arm 38 is supplied with washing liquor.

Figure 3:
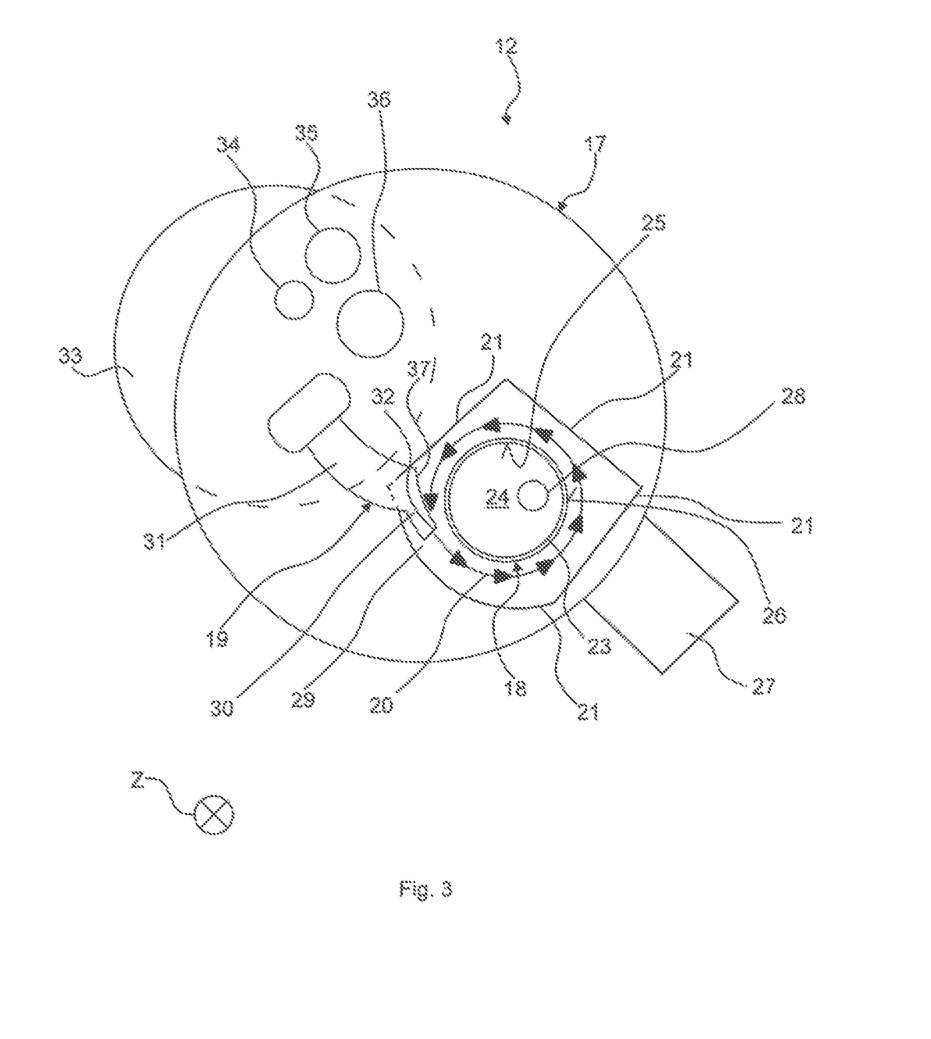
FIG. 3 shows, seen in a schematic top view, a second embodiment of a base arrangement of the water-using household appliance according to FIG. 1.

FIG. 3 shows a second embodiment of the base arrangement 12 of the household device 1 seen from a schematic top view. In contrast to FIG. 2, the first nozzle section 30 is curved around the filter element 18. In this case a wall 37 of the first nozzle section 30 faces the filter element 18 and is adapted to the tubular shape of the microfilter 23. The advantage of this is that the first nozzle section 30 fits perfectly into the annular gap 29, since the first nozzle section 30 follows at least partially the course of the annular gap 29.

For example, the first nozzle section 30 extends out of the annular gap 29 counter to the depth direction z and merges into the second nozzle section 31, which extends to the water switch 33. In this case the second nozzle section 31 extends substantially perpendicular to the depth direction z.

Figure 4:
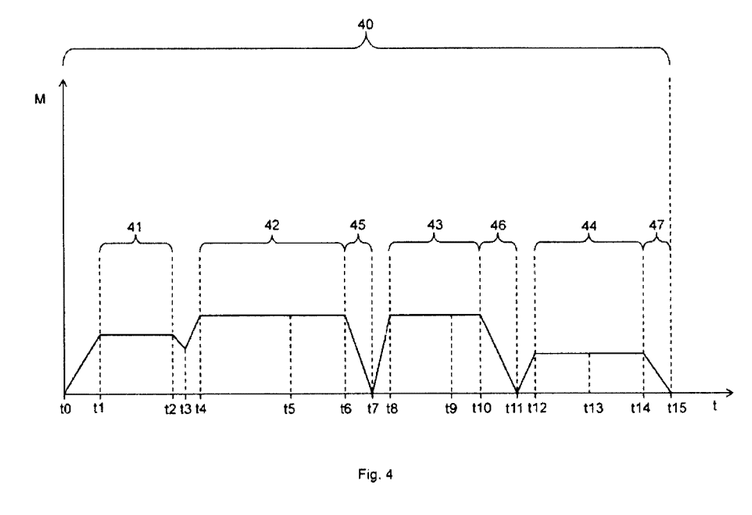
FIG. 4 shows a schematic diagram of a washing process for the water-using household appliance according to FIG. 1.

FIG. 4 shows a schematic diagram of an exemplary spray process 40 for the water-using household appliance 1 according to FIG. 1. In this case an amount of washing liquor M, which is circulated in a washing circuit of the household appliance 1 by means of a circulation pump (not shown) of the pump sump 17, is plotted over a time t, during which the washing process 40 runs.

The washing process 40 starts at a time point t0. The amount of washing liquor M is increased by means of a supply of fresh water between the time point t0 and a time point t1. A pre-wash cycle 41 is started between the time points t1 and t2. The drain pump 27 is activated between the time point t2 and a time point t3 and as a result the amount of washing liquor M decreases. The amount of washing liquor M is then increased until a time point t4 and a wash cycle 42 (also referred to here as the first wash cycle) is started, which is performed until the time point t6. Washing liquor circulates within the water-using household appliance 1 during the wash cycle 42. The circulating (or circulation) is carried out with the help of the circulation pump. The drain pump 27 is activated between the time point t6 and t7 and washing liquor is for example substantially completely or partially pumped out. This can be referred to as suction removal 45 (also referred to here as the first suction removal).

Fresh water is supplied to the household appliance 1 between the time point t7 and a time point t8 and as a result the amount of washing liquor M is increased, wherein a further wash cycle 43 (also referred to here as the second wash cycle) is started at the time point t8 and is performed until a time point t10. The drain pump 27 is activated between the time point t10 and a time point t11 and washing liquor is for example substantially completely or partially pumped out. This can be referred to as suction removal 46 (also referred to here as the second suction removal), wherein washing liquor together with dirt is sucked out with the help of the drain pump 27. Fresh water is supplied to the household appliance 1 between the time point t11 and a time point t12 and as a result the amount of washing liquor M is again increased, wherein a rinse cycle 44 is started at the time point t12 and is performed until a time point t14. The drain pump 27 is activated between the time point t14 and a time point t15 and washing liquor is substantially completely pumped out. This can be referred to as suction removal 47 (for example the third suction removal). The washing process 40 is terminated at the time point t15, for example. Drying cycles can of course follow on from the washing process 40.

The annular flow 20 is preferably produced during, in particular at the end of, the wash cycle 42 between a time point t5 and the time point t6 and/or the time point t7. After the suction removal 45 the wash cycle 43, in which washing liquor is circulated within the water-using household appliance 1, is performed, wherein after the wash cycle 43 the suction removal 46 of washing liquor together with dirt is performed with the help of the drain pump 27, and wherein the annular flow 20 is produced during, in particular at the end of, the second wash cycle 43 between a time point t9 and the time point t10 and/or t11. Furthermore, the annular flow 20 is for example produced during, in particular at the end of, the rinse cycle 44 between a time point t13 and the time point t14 and/or t15. Washing liquor pumped off during the suction removal 47 preferably has a higher temperature than washing liquor pumped off during the suction removal 45 or the suction removal 46. The temperature of washing liquor can be 55° C. to 65° C., in particular 58° C. or 63° C., before or during the suction removal 47. Because of the higher temperature an increased cleaning effect can be achieved on the filter element 18. Furthermore, the annular flow 20 between the time point t13 and the time point t14 or the time point t15 can be activated for longer than the annular flow 20 between the time point t5 and the time point t6 or the time point t7 and/or than the annular flow 20 between the time point t9 and the time point t10 or the time point t11.

The annular flow 20 can for example be produced for between 20 and 240 seconds, preferably for between 40 and 220 seconds and further preferably for between 60 and 180 seconds. For example the annular flow 20 is produced for 90 seconds between the time points t5 and t6 or t7. For example the annular flow 20 is produced for 90 seconds between the time points t9 and t10 or t11. For example the annular flow 20 is produced for 180 seconds between the time points t3 and t14 or t15. For example the annular flow 20 is produced during a suction removal 45, 46, 47 of washing liquor together with dirt with the help of the drain pump 27. The annular flow 20 can for example also be activated exactly once, twice, three times, four times or five times during the washing process 40, e.g. during the pre-wash cycle 41 and/or during the wash cycle 42 and/or during the wash cycle 43 and/or during the rinse cycle 44 and/or during the suction removal 45 and/or during the suction removal 46 and/or during the suction removal 47.

For example the annular flow 20 is in each case actuated with the help of a switching of the water switch 33. The amount of washing liquor M remains substantially constant during the pre-wash cycle 41, the first wash cycle 42, the second wash cycle 43 and the rinse cycle 44. The time points t0 to t15 are of course numbered in chronological order. The wash cycle 42 can be referred to as the cleaning phase and the wash cycle 43 as the intermediate washing phase. For example, the drain pump 27 and the nozzle unit 19 can be activated simultaneously in order to bring about an increased removal effect on the dirt.

Although the present invention has been described with reference to exemplary embodiments, it can be modified in numerous different ways.

The invention claimed is:

1. A water-using household appliance, in particular a household dishwasher, said water-using household appliance comprising:
   a pump sump;
   a filter element arranged at least partially in the pump sump; and
   a nozzle unit arranged on the pump sump, said nozzle unit configured to produce an annular flow between the pump sump and the filter element, with the annular flow flowing around the filter element in only one direction;
   wherein the nozzle unit comprises a first nozzle section projecting into an annular gap disposed between the filter element and a side wall of the pump sump; and
   wherein the first nozzle section follows a course of the annular gap such that the first nozzle section curves at least partially around the filter element.

2. The water-using household appliance of claim 1, wherein the filter element comprises a tubular microfilter having a microfilter inner side to enclose an inner compartment of the tubular microfilter, and a microfilter outer side, said nozzle unit configured to produce the annular flow around the microfilter outer side, so that dirt is removed from the microfilter inner side to the inner compartment.

3. The water-using household appliance of claim 2, further comprising a drain pump configured to suck out washing liquor together with the dirt directly from the inner compartment.

4. The water-using household appliance of claim 3, wherein the first nozzle section projects from above into the annular gap.

5. The water-using household appliance of claim 4, wherein the nozzle unit further comprises a second nozzle section; and
   wherein the first nozzle section is integrally molded onto the second nozzle section, and the second nozzle section extends away from the annular gap tangential to an outer wall of the filter element.

6. The water-using household appliance of claim 1, further comprising a water switch configured to interrupt a supply of fluid to the nozzle unit and thereby interrupt the annular flow.

7. The water-using household appliance of claim 6, further comprising a spray device for spraying fluid into an interior of the water-using household appliance, said water switch interrupting and/or controlling the supply of fluid to the spray device.

8. The water-using household appliance of claim 7, wherein the spray device is a member selected from the group consisting of a spray arm, two spray arms, a ceiling spray device, and any combination thereof.

9. A method for operating a water-using household device, comprising producing with a nozzle unit an annular flow between a pump sump and a filter element of the water-using household device, the nozzle unit comprising a first nozzle section projecting into an annular gap and following a course of the annular gap such that the first nozzle section curves at least partially around the filter element and the annular flow flows around the filter element only in one direction of flow to thereby remove dirt from the filter element.

10. The method of claim 9, wherein the annular flow is produced for a time period between 20 and 240 seconds.

11. The method of claim 9, wherein the annular flow is produced for a time period between 40 and 220 seconds.

12. The method of claim 9, wherein the annular flow is produced for a time period between 60 and 180 seconds.

13. The method of claim 9, further comprising:
performing a first wash cycle for circulating washing liquor within the water-using household device, and
performing after the first wash cycle a first suction removal of washing liquor together with dirt with a drain pump.

14. The method of claim 13, wherein the annular flow is produced during the first wash cycle, in particular at an end of the first wash cycle.

15. The method of claim 13, further comprising:
performing after the first suction removal a second wash cycle for circulating washing liquor within the water-using household appliance, and
performing after the second wash cycle a second suction removal of washing liquor together with dirt with the drain pump,
wherein the annular flow is produced during the second wash cycle.

16. The method of claim 15, wherein the annular flow is produced at an end of the second wash cycle.

17. The method of claim 9, wherein the annular flow is produced during a suction removal of washing liquor together with dirt with a drain pump.

18. The method of claim 9, further comprising switching a water switch to actuate the annular flow.

19. A household dishwasher, comprising:
a pump sump having a side wall;
a filter element arranged at least partially in the pump sump; and
a nozzle unit arranged on the pump sump, the nozzle unit configured to produce an annular flow between the pump sump and the filter element, wherein the annular flow flows around the filter element in only one direction; and
wherein the nozzle unit comprises a curved first nozzle section extending partially around the filter element and projecting into an annular gap formed between the filter element and the side wall of the pump sump; and
wherein the curved first nozzle section follows a course of the annular gap.

* * * * *